United States Patent

Yoshida

(10) Patent No.: US 8,693,764 B2
(45) Date of Patent: Apr. 8, 2014

(54) IMAGE FILE PROCESSING APPARATUS WHICH GENERATES AN IMAGE FILE TO INCLUDE STEREO IMAGE DATA AND COLLATERAL DATA RELATED TO THE STEREO IMAGE DATA, AND INFORMATION RELATED TO AN IMAGE SIZE OF THE STEREO IMAGE DATA, AND CORRESPONDING IMAGE FILE PROCESSING METHOD

(75) Inventor: Hideaki Yoshida, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/412,082

(22) Filed: Mar. 5, 2012

(65) Prior Publication Data

US 2012/0163705 A1    Jun. 28, 2012

Related U.S. Application Data

(60) Division of application No. 11/586,079, filed on Oct. 24, 2006, now Pat. No. 8,155,431, which is a continuation of application No. PCT/JP2005/007866, filed on Apr. 26, 2005.

(30) Foreign Application Priority Data

Apr. 26, 2004  (JP) ................. 2004-130127
Apr. 26, 2004  (JP) ................. 2004-130128

(51) Int. Cl.
*G06K 9/00* (2006.01)
*G06T 7/00* (2006.01)
(52) U.S. Cl.
CPC .................... *G06T 7/0075* (2013.01)
USPC ........................................... 382/154

(58) Field of Classification Search
CPC ............... G06T 7/0075; G06T 2207/10012; G06T 7/0022; G06T 1/00; H04N 2013/0081; H04N 1/00867; H04N 1/321; G08B 13/19656; A63F 13/02; B41J 2/2132; G06K 2209/40; G06K 2209/403
USPC ........................................ 382/154
See application file for complete search history.

(56) References Cited

U.S. PATENT DOCUMENTS 6,023,277 A    2/2000  Osaka et al.
6,775,665 B1   8/2004  Piersol
(Continued)

FOREIGN PATENT DOCUMENTS

EP    1 104 901 A2    6/2001
EP    1 170 657 A2    1/2002
(Continued)

OTHER PUBLICATIONS

Digital Imaging Group: "DIG35-Metadata for Digital Images", Internet Citation, XP001131278. Versopm 1.0, Aug. 30, 2000.

(Continued)

*Primary Examiner* — Edward Park
(74) *Attorney, Agent, or Firm* — Holtz, Holtz, Goodman & Chick, PC

(57) ABSTRACT

Stereo image data is generated based on a plurality of monocular images of a same subject with a predetermined parallax, a collateral data generating section generates collateral data related to the stereo image data, and a stereo image size information generating unit generates information related to an image size of the stereo image data. An image file generating unit generates an image file in conversion to a predetermined file format upon synthesizing the stereo image data and the collateral data, and further adds the information related to the image size to the collateral data at inner and outer areas thereof.

2 Claims, 12 Drawing Sheets

(56) References Cited

U.S. PATENT DOCUMENTS

| | | |
|---|---|---|
| 6,993,196 B2 | 1/2006 | Sun et al. |
| 7,053,937 B1 | 5/2006 | Aoki |
| 7,193,600 B2 | 3/2007 | Onishi et al. |
| 7,302,118 B2 | 11/2007 | Liu et al. |
| 7,676,118 B2 | 3/2010 | Liu et al. |
| 2002/0004857 A1 | 1/2002 | Arakawa et al. |
| 2002/0036804 A1 | 3/2002 | Taniguchi et al. |
| 2002/0044682 A1 | 4/2002 | Weil et al. |
| 2002/0071616 A1 | 6/2002 | Yoshida |
| 2002/0080148 A1* | 6/2002 | Uchino ............... 345/629 |
| 2002/0081020 A1* | 6/2002 | Shimazu ............. 382/154 |
| 2002/0116406 A1 | 8/2002 | Goldick |
| 2003/0123073 A1* | 7/2003 | Ohta et al. ........... 358/1.9 |
| 2004/0002841 A1 | 1/2004 | Mayuzumi et al. |
| 2004/0205546 A1* | 10/2004 | Blumberg ............ 715/512 |
| 2005/0259147 A1 | 11/2005 | Nam et al. |
| 2005/0259339 A1 | 11/2005 | Yoshida |

FOREIGN PATENT DOCUMENTS

| | | |
|---|---|---|
| EP | 1 235 143 A2 | 8/2002 |
| EP | 1 335 580 A2 | 8/2003 |
| EP | 1 351 187 A2 | 8/2003 |
| JP | 11-355733 A | 12/1999 |
| JP | 2001-160068 A | 6/2001 |
| JP | 2002-082775 A | 3/2002 |
| JP | 2002-165210 A | 6/2002 |
| JP | 2002-218506 A | 8/2002 |
| WO | WO 01/97531 A2 | 12/2001 |
| WO | WO 2004/008768 A1 | 1/2004 |

OTHER PUBLICATIONS

Supplemental European Search Report dated Sep. 18, 2008, issued in a counterpart European Application.

T. Kawai et al; Non-Linear Editing Software for Stereoscopic 3D Movies; Journal of the Institute of Image Information and Television Engineers, vol. 57, No. 2, pp. 247-252.

Extended European Search Report (EESR)dated Jul. 19, 2013 (in English) in counterpart European Application No. 11009596.5.

* cited by examiner

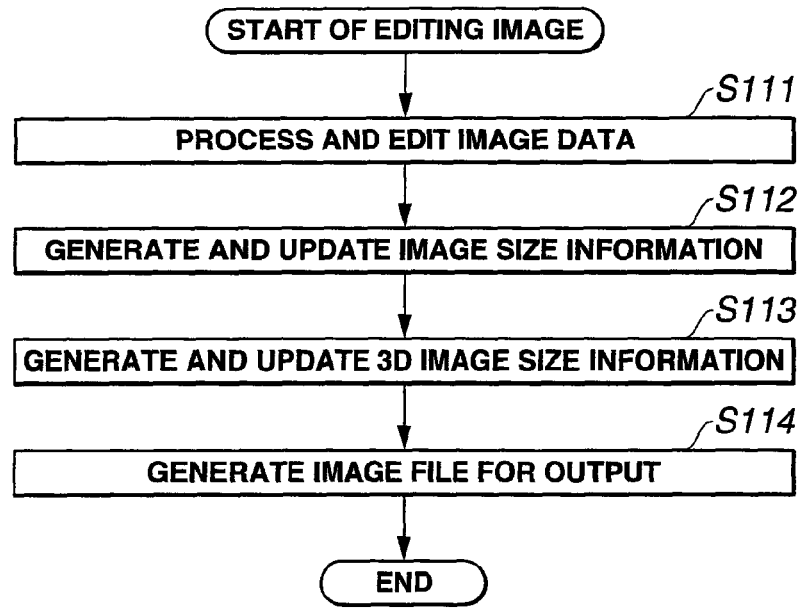
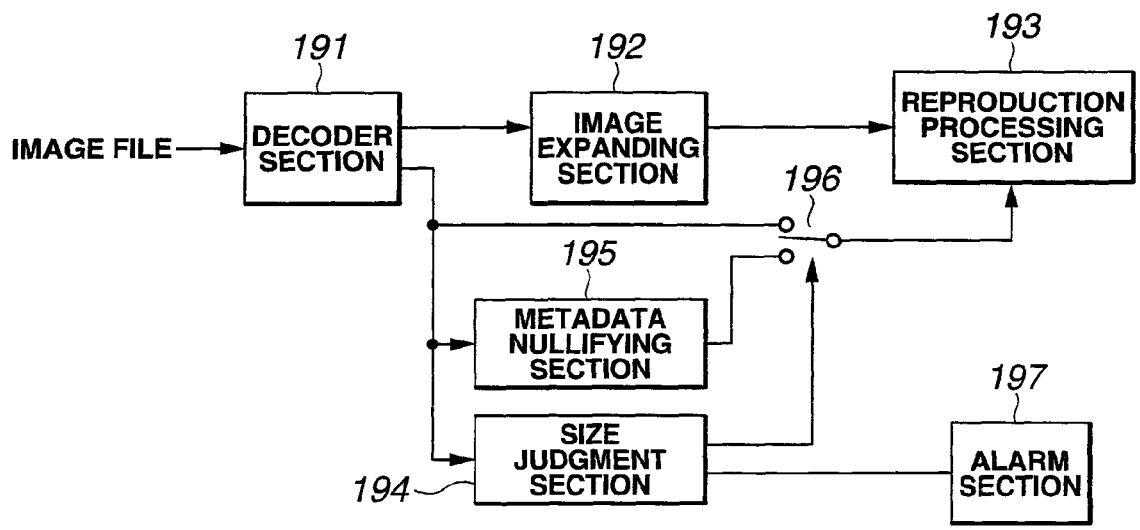

IMAGE FILE PROCESSING APPARATUS WHICH GENERATES AN IMAGE FILE TO INCLUDE STEREO IMAGE DATA AND COLLATERAL DATA RELATED TO THE STEREO IMAGE DATA, AND INFORMATION RELATED TO AN IMAGE SIZE OF THE STEREO IMAGE DATA, AND CORRESPONDING IMAGE FILE PROCESSING METHOD

CROSS REFERENCE TO RELATED APPLICATIONS

This is a Divisional Application of U.S. application Ser. No. 11/586,079, filed Oct. 24, 2006, now U.S. Pat. No. 8,155,431 which is a continuation application of PCT/JP2005/007866, filed Apr. 26, 2005, and claims the benefit of Japanese Applications No. 2004-130127 filed in Japan on Apr. 26, 2004, No. 2004-130128 filed in Japan on Apr. 26, 2004, the entire contents of all of which are incorporated herein by reference.

BACKGROUND OF THE INVENTION

1. Field of the Invention

The present invention relates to an image processing apparatus, an image processing and editing apparatus, an image reproducing apparatus, an image processing method, an image processing and editing method and image file reproducing method suitable for capturing and editing and the like of a stereo image.

2. Description of the Related Art

A wide variety of systems for shooting and recording an image, containing stereo information, and reproducing the image for observation have heretofore been proposed. Among these, a so-called two-eye-type stereo system, which is arranged to record two images with a parallax, corresponding to visual points of left and right eyes, and provides these two images to the left and right eyes, individually, has the simplest structure capable of producing a profound effect in spite of low cost and has been used from old times up to the present date.

With the two-eye-type stereo system, even though a so-called personal-use-type device has the restrictions of only one person being able to observe the image at one time, a system employing a stereo pair images is the most fundamental and classic method and has been still widely used today as a system enabling the observation of a clear stereo image at an extremely low cost.

An example of a stereo image pickup apparatus employing a stereo adapter is disclosed in Japanese Unexamined Patent Application Publication No. 2002-218506 (hereinafter referred to as Patent Document 1). Patent Document 1 discloses technology wherein a system controller includes a stereo adapter detector section for detecting the loading or unloading of a stereo adapter, an automatic exposure (AE) control section for analyzing a subject image signal, related to a measured light area, for calculation of measured light information needed for exposure control, and a measured light area setting section for setting the above-described measured light area and having a function of setting measured light areas different from each other in accordance with a normal shooting mode and a stereo shooting mode for thereby enabling the setting of measured light areas optimum for the normal shooting mode and the stereo shooting mode.

In such a way, the two-eye-type stereo system adopts a method of displaying the same subject on one image frame at left and right areas thereof in the form of two images (hereinafter referred to as monocular images) misaligned from each other in accordance with a parallax. That is, with the two-eye-type stereo system, with a view to obtaining a stereoscopic feeling from the one image frame (hereinafter also referred to as an integrated image) with the monocular images placed on the left and right areas of the image frame, the monocular images placed in the integrated image on the left and right areas thereof are observed with the right eye or the left eye, individually. Fusing the two images observed with the left and right eyes into one image enables an image to be recognized with a stereoscopic feeling. The image (hereinafter referred to as a fused image) appearing on recognition causes perspective to occur in various parts depending on the amount of misalignment in various parts of the left and right monocular images.

And now, image data, dealt by an electronic camera, includes a data format under the Exif standard that has become widely used. The Exif standard adheres to a file (JPEG file) format under the JPEG standard. That is, image data is treated as image data under the JPEG standard and the JPEG files each have a header portion Exif data (metadata). Metadata of the Exif standard is described in the TIFF format and includes information such as a shooting date and time and thumbnails and the like.

Information, related to a stereo image, can be described using such metadata. For instance, in practice, the left and right monocular images resulting from the shooting with the use of the stereo adapter encounter an eclipse occurring on a boundary area or deviation occurring in a focused position. With a view to correcting such an eclipse and positional deviation or the like, predetermined portions of the left and right areas are subjected to trimming to form set areas (hereinafter referred to as image frames) for effective monocular images. Since the areas of the image frames have much effect on a depth feeling of the stereo image, a need arises for the image frames to be appropriately set when processing and editing the stereo image. Describing information or the like, related to the trimming, with metadata allows the image frames to be appropriately set, making it possible to provide the fused image with an appropriate depth feeling.

And now, it is conceived that processing and editing software can be used to process and edit the stereo image. In such a case, it is not always true that the processing and editing is performed using processing and editing software (herein after referred to as 3D-compliant software) compliant with stereo images, and it is also conceived that the processing and editing may be executed using processing and editing software (hereinafter referred to as non-3D-compliant software) non-compliant with stereo images.

Commonly used processing and editing software is compliant with the Exif standard. Therefore, even when processing and editing the stereo image with non-3D-compliant software, image data can be processed without causing damage to a metadata area. However, it is difficult to edit the metadata area related to the stereo image using non-3D-compliant software.

SUMMARY OF THE INVENTION

The present invention provides an image processing apparatus includes stereo image data generating means for generating stereo image data on the basis of a plurality of monocular images on the same photogenic subject obtained with a predetermined parallax, collateral data generating means for generating collateral data related to the stereo image data, collateral data date and time information generating means for generating information related to a date and time when the collateral data was generated or updated, and image file generating means for generating an image file upon synthesizing stereo image data, generated by the stereo image data generating means, and collateral data, generated by the collateral data generating means, and converting to a predetermined file format, data obtained by further adding to the synthesized data, information, related to a date and time when the collateral data generated by the collateral data date and time information generating means is generated or updated, and information related to a date and time when the image file is generated or updated.

An image processing and editing apparatus according to another aspect of the present invention includes image processing and editing means for performing image processing and editing on the basis of stereo image data in an image file generated by converting to a predetermined file format, data obtained by synthesizing stereo image data, generated on the basis of a plurality of monocular images on the same photogenic subject obtained with a predetermined parallax, and collateral data, related to the stereo image data, and further adding information, related to a date and time at which the collateral data was generated or updated, and information related to a date and time at which the image file is generated or updated, collateral data updating means for updating the collateral data, before the image processing and editing is conducted, on the basis of a content of the image processing and editing, collateral data updating date and time information generating means for generating information related to a date and time at which the collateral data is updated, and image file generating means for generating an image file upon synthesizing stereo image data image processed and edited by the image processing and editing means, and collateral data, updated by the collateral data updating means, and converting the image file to a predetermined file format upon further adding information related to a date and time, at which the collateral data, generated by the collateral data date and time information updating means, is updated, and information related to a date and time at which the image file is generated or updated.

An image file reproducing apparatus according to a further aspect of the present invention includes reproducing means for reproducing an image file generated by converting to a predetermined file format, data obtained by synthesizing stereo image data, generated on the basis of a plurality of monocular images on the same photogenic subject obtained with a predetermined parallax, and collateral data, related to the stereo image data, and further adding information, related to a date and time at which the collateral data was generated or updated, and information related to a date and time at which the image file is generated or updated, judging means for judging a coincidence between information, related to a date and time at which the collateral data, reproduced by the reproducing means, is generated or updated, and information related to a date and time at which the image file is generated or updated, and controlling means for inhibiting continued reproduction operation of the reproducing means in the presence of judgment made by the judging means of an inconsistency.

An image processing apparatus according to a still further aspect of the present invention includes stereo image data generating means for generating stereo image data on the basis of a plurality of monocular images on the same photogenic subject obtained with a predetermined parallax, collateral data generating means for generating collateral data related to the stereo image data, stereo image size information generating means for generating information related to an image size of the stereo image data, and image file generating means for generating an image file in conversion to a predetermined file format upon synthesizing stereo image data, generated by the stereo image data generating means, and collateral data, generated by the collateral data generating means, and further adding information, related to the image size generated by the stereo image size information generating means, to the collateral data at inner and outer areas thereof.

An image processing and editing apparatus according to yet another aspect of the present invention includes image processing and editing means for image processing and editing on the basis of stereo image data contained in an image file generated by converting to a predetermined file format, data obtained by synthesizing stereo image data generated on the basis of a plurality of monocular images on the same photogenic subject obtained with a predetermined parallax, and collateral data, related to the stereo image data, and further adding information, related to the image size of the stereo image data, to the collateral data at inner and outer areas thereof, collateral data updating means for updating the collateral data, prior to the data being subjected to the image processing and editing, on the basis of an image processing and editing content, stereo image size information updating means for updating information related to individual image sizes for the image processing and editing content for information, related to an image size of the stereo image data prior to the data being subjected to the image processing and editing, which is added to the collateral data at inner and outer areas thereof, individually, and image file generating means for generating an image file in conversion to a predetermined file format upon synthesizing stereo image data image processed and edited by the image processing and editing means, and collateral data, updated by the collateral data updating means, and adding data, related to image data updated by the stereo image size information updating means, to the collateral data at inner and outer areas thereof.

An image file reproducing apparatus according to a yet still further aspect of the present invention includes reproducing means for reproducing an image file generated by converting to a predetermined file format, data obtained by synthesizing stereo image data, on the basis of a plurality of monocular images on the same photogenic subject obtained with a predetermined parallax, and collateral data, related to the stereo image data, and further adding information, related to the image size of the stereo image data, to the collateral data at inner and outer areas thereof, individually, judging means for judging a coincidence between information, related to an image size contained in the inside of the collateral data, reproduced by the reproducing means, and information related to an image size contained in the outside of the collateral data, and controlling means for inhibiting continued reproduction operation of the reproducing means in the presence of judgment made by the judging means of an inconsistency.

BRIEF DESCRIPTION OF THE DRAWINGS

FIG. 14 is a flow chart showing a processing flow for generating an image file.

FIG. 15 is a block diagram showing an image file reproducing apparatus of a sixth embodiment according to the present invention.

DETAILED DESCRIPTION OF THE PREFERRED EMBODIMENTS

Figure 1:
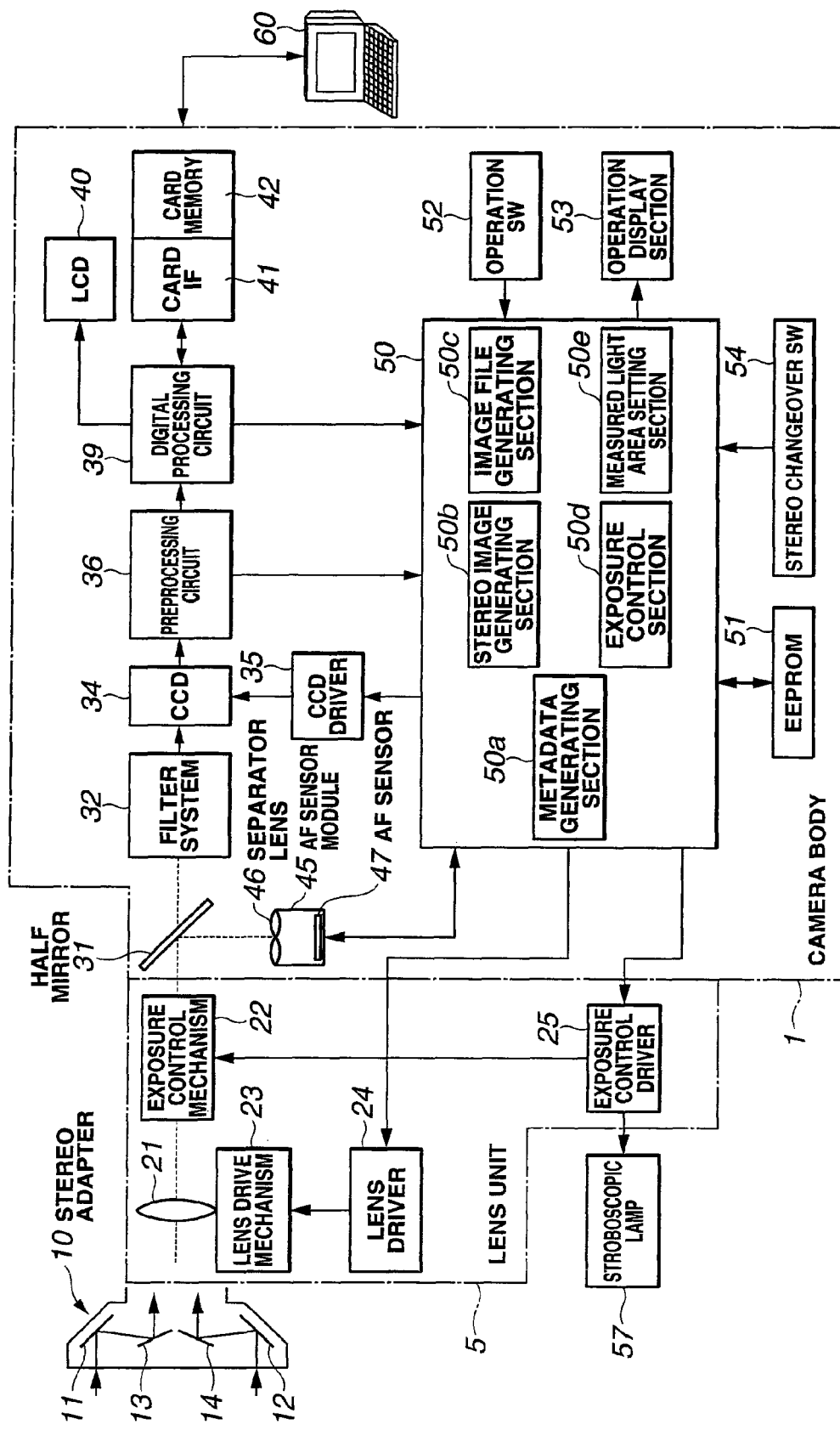
FIG. 1 is a block diagram showing an electronic camera incorporating an image processing apparatus of a first embodiment according to the present invention.

Hereunder, an embodiment of the present invention is described in detail with reference to the accompanying drawings. FIG. 1 is a block diagram showing an electronic camera incorporating an image processing apparatus of a first embodiment according to the present invention. The present embodiment represents a case applied to an image file recording apparatus.

First Embodiment

In FIG. 1, an electronic camera comprises a camera body 1, a lens unit 5 having a lens barrel, and a stereo adapter 10 for shooting a stereo image. In the electronic camera, the stereo adapter 10 of a mirror type is detachably mounted on the lens unit 5. The stereo adapter 10 takes the form of a structure that includes mirrors 11, 12, placed in positions spaced from each other by a distance corresponding to parallax, and mirrors 13, 14 for guiding light beams, reflected from the mirrors 11, 12, to the camera.

The light beams, passing through the mirrors 11, 13 and the mirrors 12, 14 disposed inside the stereo adapter 10, pass through a shooting lens group 21 in the lens unit 5 to an exposure control mechanism 22 and then are guided to a half mirror 31 mounted inside the camera body 1.

The lens unit 5 comprises the shooting lens group 21, the exposure control mechanism 22, a lens drive mechanism 23, a lens driver 24 and an exposure control driver 25.

The shooting lens group 21 plays the role of a main image pickup optical system, which is capable of picking up an image (as a monocular picked up image) with normal monovision in a state in which no stereo adapter 10 is mounted, and is driven with the lens drive mechanism 23 to adjust the focusing or zooming. The lens driver 24 controls the lens drive mechanism 23. The exposure control mechanism 22 is configured to control a lens diaphragm of the shooting lens group 21 and a shutter apparatus (not shown). The exposure control driver 25 controls the exposure control mechanism 22.

The light beams, guided to the camera body 1 from the lens unit 5, pass through the half mirror 31 and are then guided through a low pass and infrared cut filter system 32 to a CCD color image pickup element 34 for image formation. The CCD driver 35 controllably drives the CCD color image pickup element 34 for conversion of an optical image of the photogenic subject into an electric signal. Note that, for the CCD color image pickup element 34, use is made of, for instance, an image pickup element of a vertical type overflow drain structure of an interline type and progressive (sequential) scan type.

The light beam incident on the left vision mirror 11 of the stereo adapter 10 is focused on a region L of an imaging area (not shown) of the CCD color image pickup element 34 via the mirror 13 and the shooting lens group 21. Likewise, the light beam incident on the right vision mirror is focused on a region R of another imaging area (not shown) of the CCD color image pickup element 34 via the mirror 14 and the shooting lens group 21.

The CCD color image pickup element 34 executes photoelectric conversion to generate signals that are delivered through a preprocessing circuit 36, including an A/D converter, etc., to a digital processing circuit 39 for executing color signal generation processing, matrix conversion processing and other related various digital processing. The digital processing circuit 39 executes the processing of digitized image signals thereby generating color image data.

An LCD display section 40 is connected to the digital processing circuit 39 to which a memory card 42, such as a CF (Compact Flash Memory Card), smart media or the like, is also connected via a card interface (IF) 41. The LCD display section 40 provides a display on the basis of color image data, and the memory card 42 stores color image data.

In addition, the memory card 42 can be connected to an external personal computer 60. The image, recorded on the memory card 42, can be displayed on and subjected to image processing in the personal computer 60. Further, the image, recorded on the memory card 42, can also be printed out using a printer (not shown).

Since the half mirror 31 is structured to partially reflect light beams of an incident subject image, reflected light beams are guided to an AF sensor module 45. The AF sensor module 45 detects focuses according to the incident light beams incoming through the shooting lens group 21. The AF sensor module 45 comprises a pupil division separator lens 46 and an AF sensor 47 composed of a line sensor.

A system controller 50, composed of a CPU, etc., performs integrated control on various parts inside the camera body 1 and the lens unit 5. The lens driver 24, the exposure control driver 25, the CCD driver 35, the preprocessing circuit 36, the digital processing circuit 39 and the AF sensor module 45 are connected to the system controller 50 to which an operation switch section 52, an operation display section 53, a non-volatile memory (EEPROM) 51 and a stereo changeover switch (SW) 54 are also connected.

The operation switch section 52 comprises a variety of switches such as a release switch, a shooting mode setter, etc. The operation display section 53 plays the role as a display unit for displaying an operational status of the camera, a mode status, etc.

The EEPROM 51 plays the role as a memory to store various preset information or the like. The stereo changeover switch 54 acts as a changeover switch for shifting modes when the stereo adapter 10 is connected to the lens unit 5. In addition, while the shooting mode is herein described as being shifted upon operating the stereo changeover switch 54, the present invention is not limited to such operation. For instance, the stereo adapter 10 may have a detecting function to automatically perform changing of the shooting mode.

The system controller 50 allows the exposure control mechanism 22 and the CCD driver 35 to controllably drive the CCD color image pickup element 34 for reading out an exposure (in stored electric charge) and the related signals. With the system controller 50, outputs of the CCD 34 are supplied through the preprocessing circuit 36 to the digital processing circuit 39 with which various signals are processed and resulting signals are recorded on the memory card 42 via the card interface 41.

A stroboscopic lamp 57 generates a flashlight and is controlled by the system controller 50 via the exposure control driver 25 incorporated in the lens unit 5.

The system controller 50 further includes an exposure control section 50d and a measured light area setting section 50e. The exposure control section 50d analyzes the subject image signals related to a measured light area and calculates exposure information demanded for exposure control. Moreover, the measured light area setting section 50e sets a measured area for the exposure control section 50d.

With the present embodiment, the system controller 50 further includes a metadata generating section 50a, a stereo image generating section 50b and an image file generating section 50c.

The metadata generating section 50a, acting as collateral data generating means, generates a variety of collateral data (hereinafter referred to as metadata), related to a picked up image, for delivery to the image file generating section 50c. For instance, with information of a shooting date and time and a picked up image belonging to a stereo image, the metadata generating section 50a generates a variety of information (stereo image information) related to the stereo image. An example of stereo image information includes, for instance, trimming information. Trimming information is information representing effective image frames of corresponding monocular images and indicates a region for use in recognizing a fused image during a stage of reproduction.

The stereo image generating section 50b is configured to generate a stereo image on the basis of a plurality of input monocular images. For instance, under a circumstance where one image is generated by focusing a plurality of monocular images present in an imaging area of the CCD 34, the stereo image generating section 50b generates a stereo image with the input images being used intact. In addition, under another circumstance where, for instance, a plurality of monocular images are separately shot and input, the stereo image generating section 50b generates a stereo image on the basis of the individual input monocular images.

The image file generating section 50c is configured to have capability of permitting the stereo image, resulting from the stereo image generating section 50b, to be converted into an electronic image file with a predetermined format to be output. With the stereo image belonging to an integrated image, the image file generating section 50c converts one integrated image into an image format compliant with, for instance, the JPEG standard or TIFF standard to form one image file. Further, with the stereo image composed of a plurality of monocular images, the image file generating section 50c forms one an image file upon allocating the individual monocular images to corresponding pages under TIFF format.

During such operation, the image file generating section 50c executes digital compression of the stereo image according to needs for conversion to a digital image file with a predetermined format added with collateral data (metadata).

Figure 2:
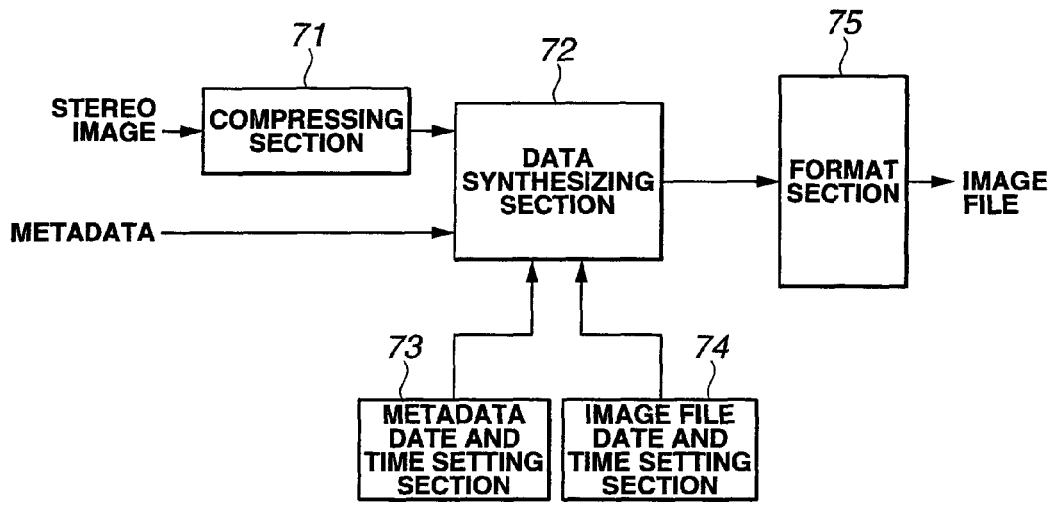
FIG. 2 is a block diagram showing a specific structure of an image file generating section 50c in FIG. 1.
Figure 3:
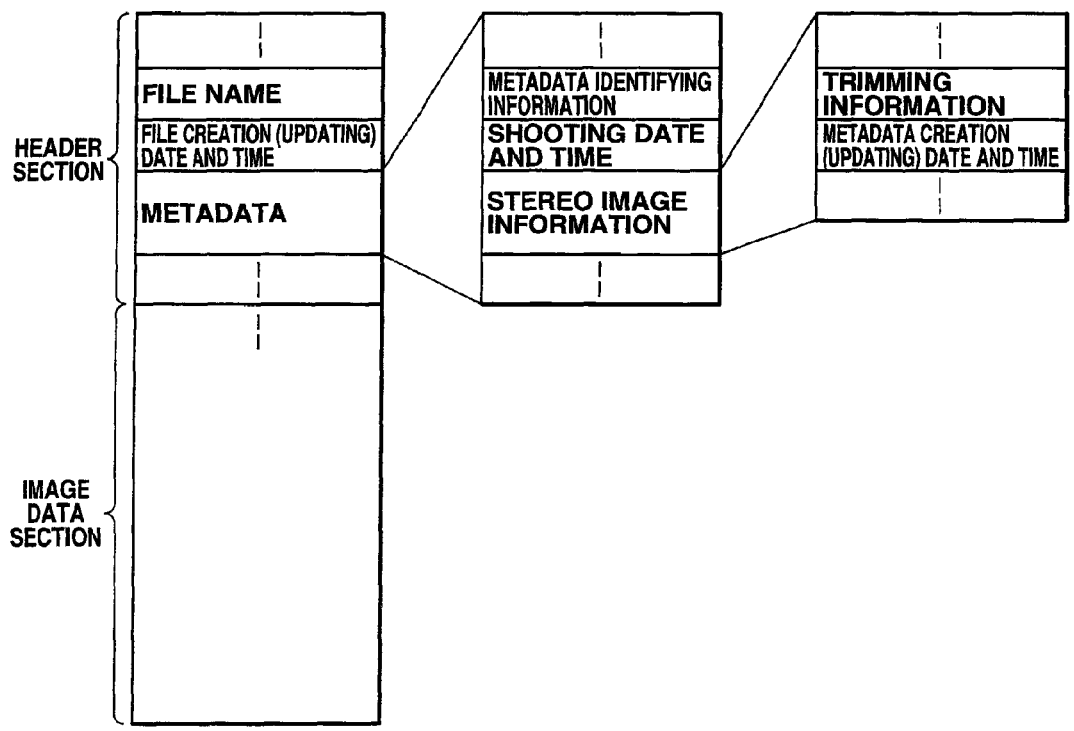
FIG. 3 is an illustrative view showing an example of an image file generated by the image file generating section 50c.

FIG. 2 is a block diagram showing a specific structure of the image file generating section 50c shown in FIG. 1. FIG. 3 is an illustrative view showing one example of an image file produced by the image file generating section 50c.

The image file generating section 50c comprises a compressing section 71 to which image data on the stereo image is input. The compressing section 71 executes a predetermined compressing operation on image data of the stereo image for output to a data synthesizing section 72. Metadata is also supplied to the data synthesizing section 72, which consequently synthesizes image data and metadata.

In the present embodiment, the image file generating section 50c further includes a metadata date and time setting section 73 and an image file date and time setting section 74. The metadata date and time setting section 73 is configured to have capability of outputting information of created date and time on metadata related to various stereo image information to the data synthesizing section 71. Further, the image file date and time setting section 74 is configured to have a capability of outputting information on created date and time of the image file to the data synthesizing section 72. In addition, both the metadata date and time setting section 73 and the image file date and time setting section 74 are configured to perform the setting of a date and time for the last updating of the image file, that is, the setting of the same date and time in this case.

The data synthesizing section 72 synthesizes various input data into synthesized data for delivery to a format section 75. The format section 75 arranges various input data in accordance with a predetermined image format to output as one image file.

As shown in FIG. 3, the image file includes a header section and an image data section. The image data section is placed with image data compressed with the compressing section 71. The header section has, in addition to a file name of the image file and file creation (updating) date and time, metadata to be placed. Information on the file creation (updating) date and time is set by the image file date and time setting section 74.

Metadata includes metadata discriminating information, information on a date and time at which an image is shot, and information related to a stereo image. Note that, information on the shooting date and time is information included in metadata that is generated by the metadata generating section 50a and input to the data synthesizing section 72.

Under a circumstance where image data placed in the image data section belongs to a stereo image, stereo image information contains a variety of information related to the stereo image. Trimming information is generated by the metadata generating section 50a and contained in metadata input to the data synthesizing section 72. A metadata creation (updating) date and time information is information set by the metadata date and time setting section 73 and contains the metadata creation date and time related to various stereo image information.

In addition, the file format shown in FIG. 3 is one example of an image file. While the file format, shown in FIG. 3, has been described with reference to an example of the metadata creation (updating) date and time placed as one part of stereo image information, the metadata creation (updating) date and time may be placed in another part of the metadata area.

Further, while the present embodiment has been described with reference to an example where the controller 50 is 3D-compliant, if the controller 50 is non-3D-compliant, for instance, a predetermined initial value is set in or no information is described in a description area of stereo image information in the metadata area.

Figure 4:
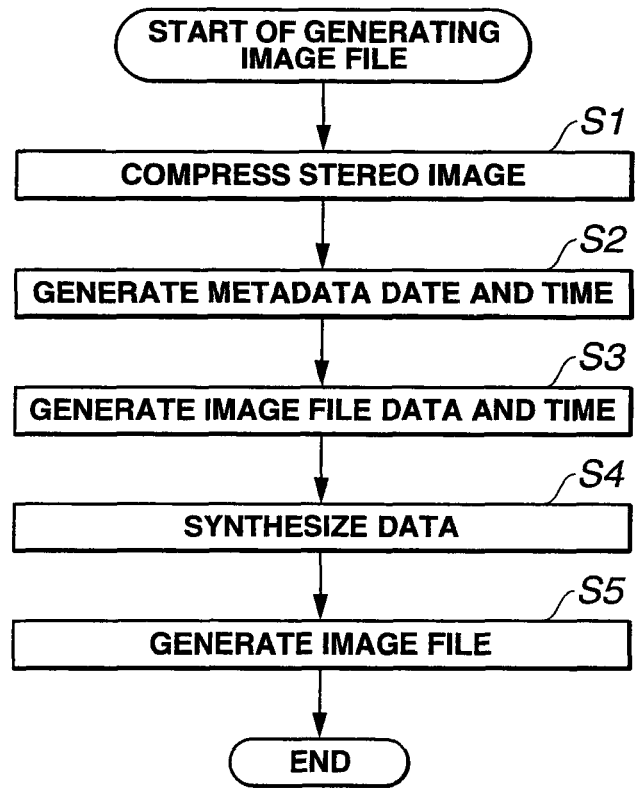
FIG. 4 is a flow chart showing an operational flow of the image file generating section 50c.

Next, the operation of the present embodiment with such a structure set forth above is described with reference to FIG. 4. FIG. 4 is a flow chart showing a sequence of operations to be executed by the image file generating section 50c.

Now, supposing the stereo changeover switch 54 commands a stereo shooting mode. A subject optical image incident from the stereo adapter 10 passes through the image pickup lens group 21, the exposure control mechanism 22, the half mirror 31 and the filter system 32 and is then focused on the imaging area of the CCD color image pickup element 34. The CCD color image pickup element 34 outputs one image data containing left and right monocular images L, R. The image signal output from the CCD color image pickup element 34 is input to the controller 50 via the preprocessing circuit 36.

The stereo image generating section 50b generates an integrated image, comprising monocular images on left and right areas, on the basis of the input image signal. The metadata generating section 50a generates information on a shooting date and time, related to the generated integrated image, and stereo image information.

In step S1 shown in FIG. 4, the image file generating section 50c executes a predetermined compressing operation on the generated integrated image (stereo image). In a subsequent step S2, the metadata date and time setting section 73 of the image file generating section 50c generates information on a creation date and time of metadata related to stereo image information resulting from the metadata generating section 50a. Note that, the metadata date and time setting section 73 may be configured to treat a current time as a metadata creation date and time. In step S3, the image file date and time setting section 74 of the image file generating section 50c generates the same date and time as that of the metadata creation date and time as information of the image file creation date and time.

With the image file generating section 50c, the data synthesizing section 72 synthesizes information on a stereo image, metadata, a metadata creation date and time and an image file creation date and time (in step S4) and the format section 75 generates an image file with the data format shown in FIG. 3 (in step S5).

The image file resulting from the image file generating section 50c is supplied to the digital processing circuit 39. The digital processing circuit 39 can display the integrated image on a display area of an LCD 40 according to the input electronic image file. Moreover, the digital processing circuit 39 can deliver the input electronic image file to the memory card 42 for storage via the card IF 41.

In addition, while the present embodiment has been described with reference to an example wherein information on the image file creation date and time is matched to information on the metadata creation date and time, it will be apparent that information on the metadata creation date and time is matched to the image file creation date and time.

In the present embodiment, thus, the image file generated by the image file generating section is placed with, in addition to information on the image file creation date and time, information on the metadata creation date and time related to stereo image information. Information of the metadata creation (updating) date and time related to stereo image information is placed in the image file creation (updating) date and time for independently executing management of the image file creation (updating) date and time and the metadata creation (updating) date and time related to stereo image information. In a case where the image file is generated (updated) with non-3D-compliant equipment or software, no metadata creation (updating) date and time related to stereo image information is created or updated. Thus, comparing information on these dates and times enables judgment to be made to determine whether or not the image file was generated (updated) with non-3D-compliant equipment or software.

Moreover, while the present embodiment has been described with reference to an example where the metadata creation (updating) date and time and the image file creation (updating) date and time are matched to each other, in general, an actual metadata creation (updating) date and time and the image file creation (updating) date and time are nearly matched to each other or a related time difference is relatively small. Thus, the actual creation (updating) data and time may be set. In such a case, since a difference between these dates and times is less than a threshold value, judgment can be made to determine whether or not the image file was generated (updated) with non-3D-compliant equipment or software.

Further, while the present embodiment has been described with reference to an example where the image file is generated by the image processing apparatus equipped with the image file generating section, it is clear that the image file generating section can be realized using software providing the same function as that of the image file generating section. That is, by using a computer available to work on programs having the same function as that of the flow chart shown in FIG. 4, it becomes possible to prepare the same image file generating section as that shown in FIG. 2.

Furthermore, in a case where the image file generating section 50c is structured with software, for instance, the image file date and time setting section 74 is generally composed of an operation system, etc., of a computer and the image file creation (updating) date and time is automatically described when the file is generated (updated).

Although the present embodiment has been described with reference to an example where data such as a file name and a file creation (updating) date and time are placed in the header section of the image file, such data may be placed in a directory entry area that is directly placed in and managed by an OS of a computer.

Moreover, although the first embodiment has been described with reference to an example applied to the electronic camera, the present invention can be applied to an independent image processing apparatus adapted to process an image picked up with an electronic camera and can also be arranged to accomplish a similar function with the use of programs of a personal computer or the like for processing the picked up image.

Besides, while the present embodiment has been described with reference to an example where the camera obtains one image having left and right areas placed with the monocular images and the stereo image is generated on the basis of such images, it is clear that the present invention can be applied to a case wherein, for instance, individual monocular images, obtained by independently shooting a subject with two cameras, are separately input and one stereo image is generated on the basis of these monocular images.

Second Embodiment

Figure 5:
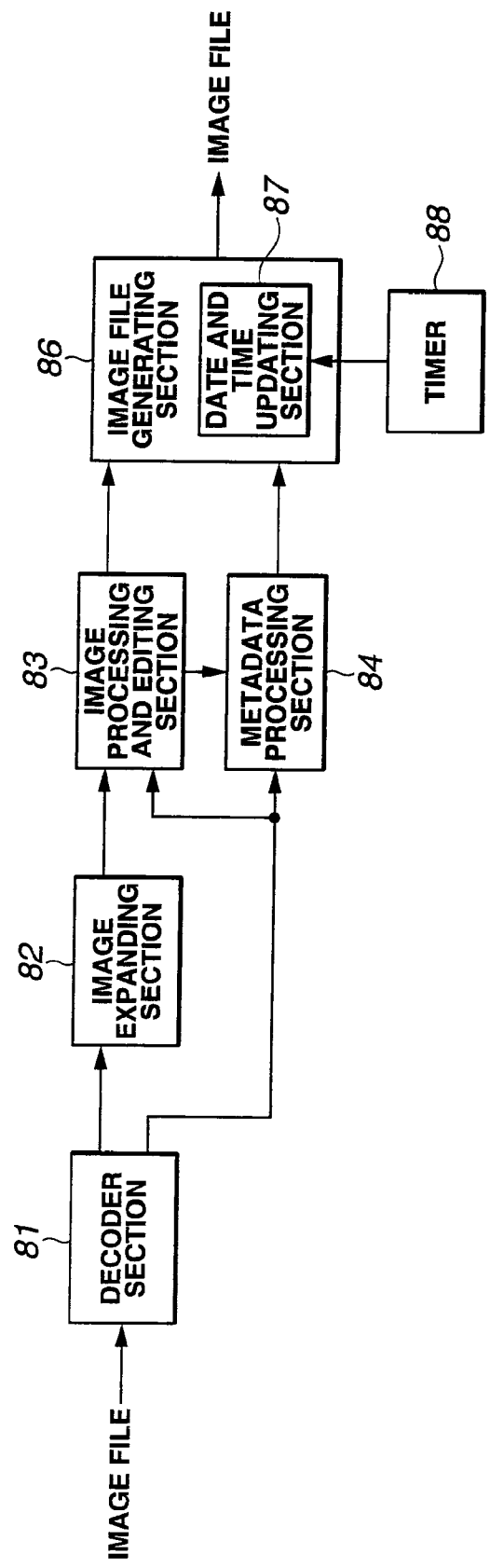
FIG. 5 is a block diagram showing an image processing and editing apparatus of a second embodiment according to the present invention.
Figure 6:
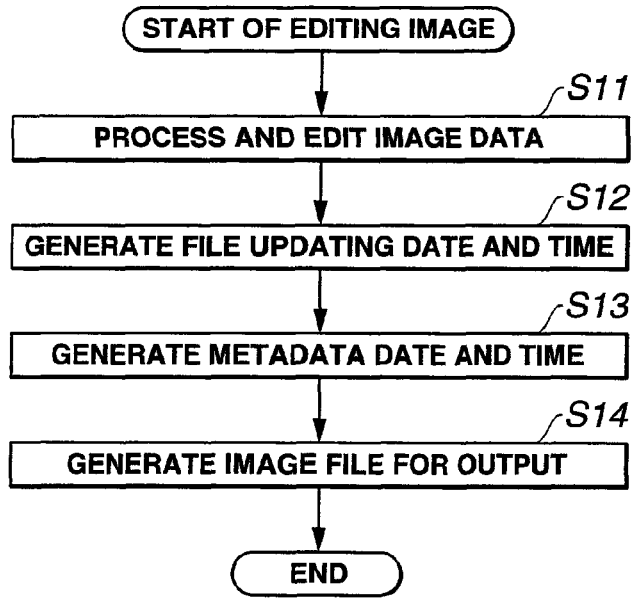
FIG. 6 is a flow chart showing a processing flow for generating an image file.

FIG. 5 is a block diagram showing an image processing and editing apparatus of a second embodiment according to the present invention and FIG. 6 is a flow chart showing a process flow for generating an image file. The present embodiment is applied to an image file editing apparatus. Note that, the present embodiment can also be realized using software having the same function as that of the apparatus shown in FIG. 5.

A decoder section 81 is input with the image file having the data format shown in FIG. 3. The decoder section 81 decodes the input image file and retrieves various data from the image file. The decoder section 81 delivers image data of the image file to an image expanding section 82 while supplying metadata to a metadata processing section 84.

The image expanding section 82 expands input image data and obtains image data before compression thereof. This image data is supplied to an image processing and editing section 83.

The image processing and editing section 83 executes the processing and editing of the input image data depending on processing and editing operations executed by a user (in step S11) and outputs an image, subjected to the processing and editing, to an image file generating section 86. Note that, the image processing and editing section 83 can refer to metadata on an image to be processed and edited for use in the processing and editing.

The metadata processing section 84 updates metadata on the basis of the processing and editing operations executed by the image processing and editing section 83. For instance, in a case where the processing and editing operations of the image processing and editing section 83 belong to operation for expanding a stereo image, the metadata processing section 84 updates trimming information representing an optimum clipping area in response to such expanding operation.

An image file generating section 86 synthesizes image data, delivered from the image processing and editing section 83, and metadata, delivered from the metadata processing section 84, and generates an image file with the file format shown in FIG. 3. A date and time updating section 87, incorporated in the image file generating section 86, is supplied with current time information from a timer 88 and sets file updating date and time information (in step S12). The image file generating section 86 rewrites a file creation (updating) date and time (see FIG. 3) in the file format to such updating date and time information. Further, the image file generating section 86 rewrites a metadata creation (updating) date and time (see FIG. 3) in the file format to the same date and time information as the file creation (updating) date and time (in step S13). Thus, the image file generating section 86 generates and outputs an image file in which the file creation (updating) date and time and the metadata creation (updating) date and time are altered to the same dates and times (in step S14).

With the present embodiment, thus, metadata is updated with the processing and editing of the image and alters the relevant updating date and time to a current date and time identical to the image file creation (updating) date and time. This results in matching between the image file creation (updating) date and time and the metadata creation (updating) date and time as far as the image is processed and edited with the use of the editing apparatus of the present embodiment.

Note that, information on the metadata updating date and time and the image file updating date and time may not necessarily depend on an actual updating date and time provided that the same date and time exists.

Third Embodiment

Figure 7:
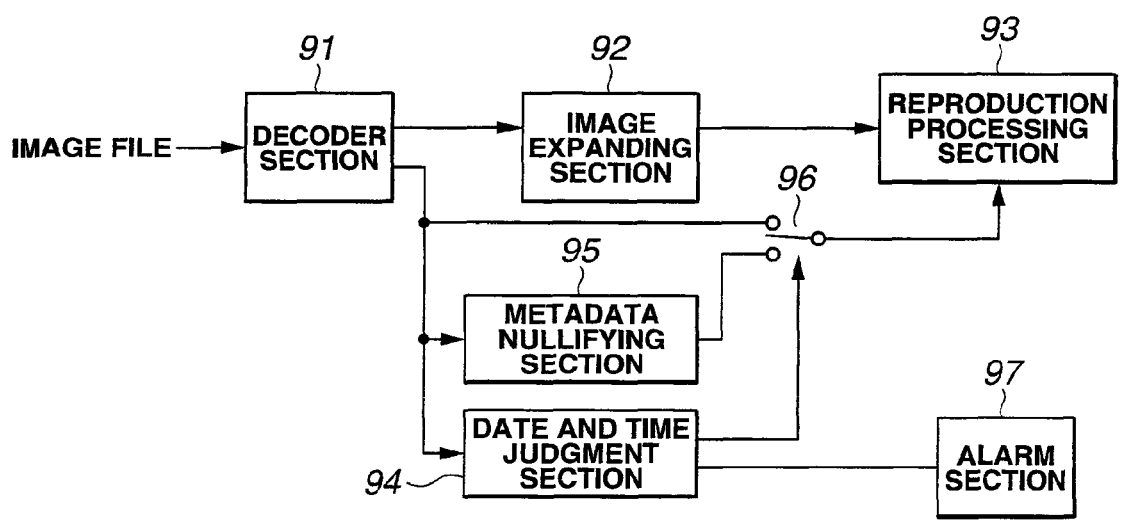
FIG. 7 is a block diagram showing an image file reproducing apparatus of a third embodiment according to the present invention.
Figure 8:
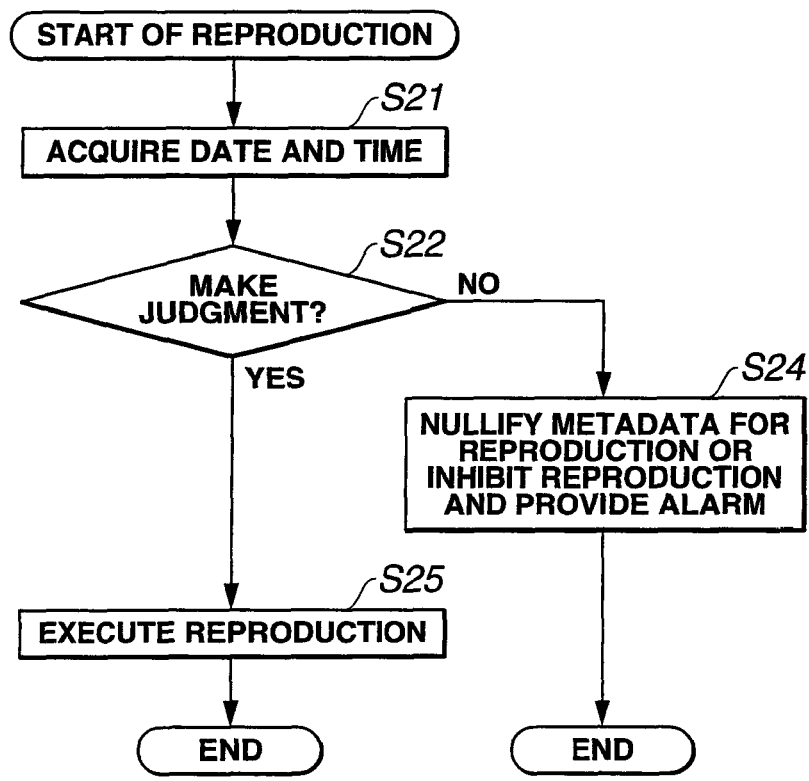
FIG. 8 is a flow chart showing a processing flow of an image file.

FIG. 7 is a block diagram showing an image file reproducing apparatus of a third embodiment according to the present invention. FIG. 8 is a flow chart showing a process flow of an image file. The present embodiment is applied to an image file reproducing apparatus. Note that, the present embodiment may be realized with software having the same function as that of the apparatus shown in FIG. 7.

A decoder section 91 is input with the image file having the file format shown in FIG. 3. The decoder section 91 decodes the input image file and retrieves various data from the image file. The decoder section 91 supplies image data of the image file to an image expanding section 92 while supplying metadata to a metadata nullifying section 95 and a date and time judgment section 94.

The image expanding section 92 expands input image data and obtains image data prior to compression thereof. This image data is supplied to a reproduction processing section 93.

The date and time judgment section 94 obtains information on the file creation (updating) date and time (see FIG. 3) and metadata creation (updating) date and time (in step S21). The date and time judgment section 94 makes judgment as to whether or not the file creation (updating) date and time matches the metadata creation (updating) date and time (in step S22). The date and time judgment section 94 outputs a judgment result to a changeover section 96 and an alarm section 97.

Note that, the date and time judgment section 94 may be arranged to make judgment that information of both the dates and times match each other as far as the metadata creation (updating) date and time and the file creation (updating) date and time fall in a predetermined threshold value. However, when taking into consideration the occurrence of erroneous judgment caused depending on the threshold value being set, judgment is principally made that both the dates and times match each other only when these dates and times are completely identical.

The metadata nullifying section 95 nullifies input metadata (in step S24). For instance, the metadata nullifying section 95 executes the nullification by deleting parameters of metadata, related to the stereo image, or setting the same to initial values.

The changeover section 96 selectively supplies one of metadata, delivered from the decoder section 91, and metadata, delivered from the metadata nullifying section 95, to the reproduction processing section 93 on the basis of a judgment result of the date and time judgment section 94. For instance, with a judgment result predetermined with the dates and times matched, the changeover section 96 supplies metadata from the decoder section 91 to the reproduction processing section 93 and with a judgment result predetermined with the dates and times unmatched, the changeover section 96 inhibits reproduction processing (in step S24).

The reproduction processing section 93 executes predetermined reproduction processing on image data using metadata delivered from the changeover section 96 (in step S25). Further, the reproduction processing section 93 may be configured to supply metadata information, set by the metadata nullifying section 95, to the reproduction processing section 93 upon receipt of a judgment result representing that the dates and times delivered from the date and time judgment section 94 are unmatched.

With the judgment result of the date and time judgment section 94 representing the dates and times unmatched, an alarm section 97 provides a user with, for instance, an alarm using, for instance, an alarm display or the like.

With the present embodiment, thus, if both the dates and times of an image file, in which the creation (updating) dates and times, at which a file and metadata are generated, are independently described, reproduction processing is inhibited as having no correlation between image data and metadata or reproduction processing is executed using nullified metadata. By so doing, reproduction processing can be prevented from being executed using metadata having no correlation to image data under a situation where the image is processed and edited with non-3D-compliant equipment or software.

Fourth Embodiment

Figure 9:
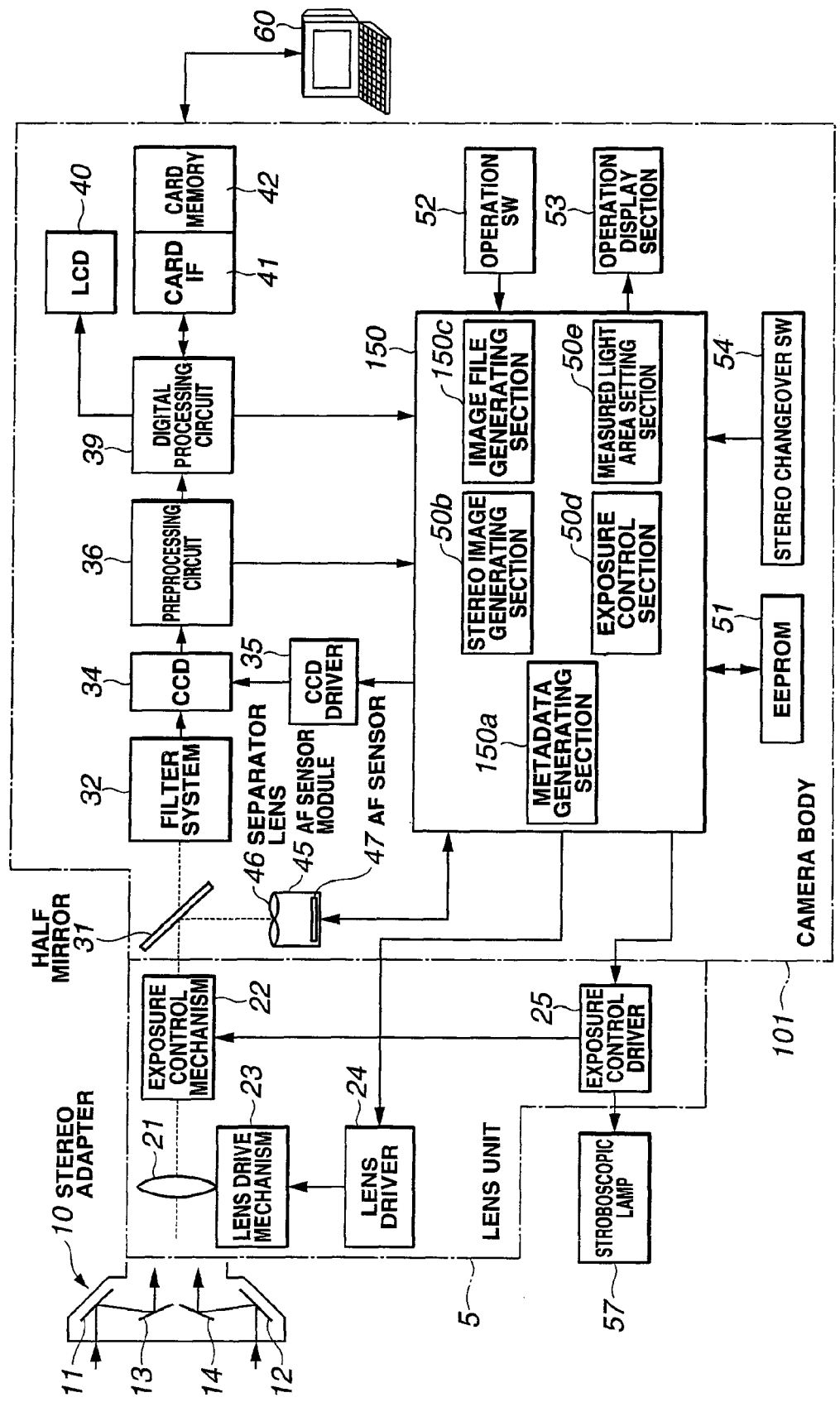
FIG. 9 is a block diagram showing an electronic camera incorporating an image processing apparatus of a fourth embodiment according to the present invention.

FIG. 9 is a block diagram showing an electronic camera incorporating an image processing apparatus of a fourth embodiment according to the present invention. The present embodiment is applied to an image file recording apparatus. The same component parts as those of FIG. 1 bear the same reference numerals in FIG. 9 for omission of redundant description.

A camera body 101 of the present embodiment differs from the camera body 1 of the first embodiment in that a system controller 150 is employed in place of the system controller 50. The system controller 150 differs from the system controller 50 in that a metadata generating section 150a and an image file generating section 150c are adopted in place of the metadata generating section 50a and the image file generating section 50c.

The metadata generating section 150a, playing a role as a collateral data generating means, generates various collateral data (hereinafter referred to metadata) related to a picked up image for delivery to the image file generating section 150c. For instance, the metadata generating section 150a generates information on a shooting date and time and when the picked up image includes a stereo image, various information (stereo image information) related to a stereo image is generated. Stereo image information may include, for instance, an optimum trimming position that is trimming information. Information on the optimum trimming position is information representing effective image frames of individual monocular images and indicates an area for use in recognizing a fused image during reproduction thereof. In addition, stereo image information may also include information on a maximal protruding amount that specifies the maximum value with a depth feeling of the stereo image.

The image file generating section 150c is configured to be capable of converting and outputting the stereo image, generated by the stereo image generating section 50b, to an electronic image file with a predetermined format. Under a circumstance where the stereo image belongs to an integrated image, the image file generating section 150c converts one integrated image to an image format with, for instance, JPEG standard or TIFF standard into one image file. Under a circumstance where the stereo image is composed of a plurality of monocular images, the image file generating section 150c allocates the individual monocular images to individual pages with TIFF formats into one image file.

In such a case, the image file generating section 150c executes processing to compress the stereo image depending on needs for conversion into a digital image file with a predetermined format added with collateral data (metadata).

Figure 10:
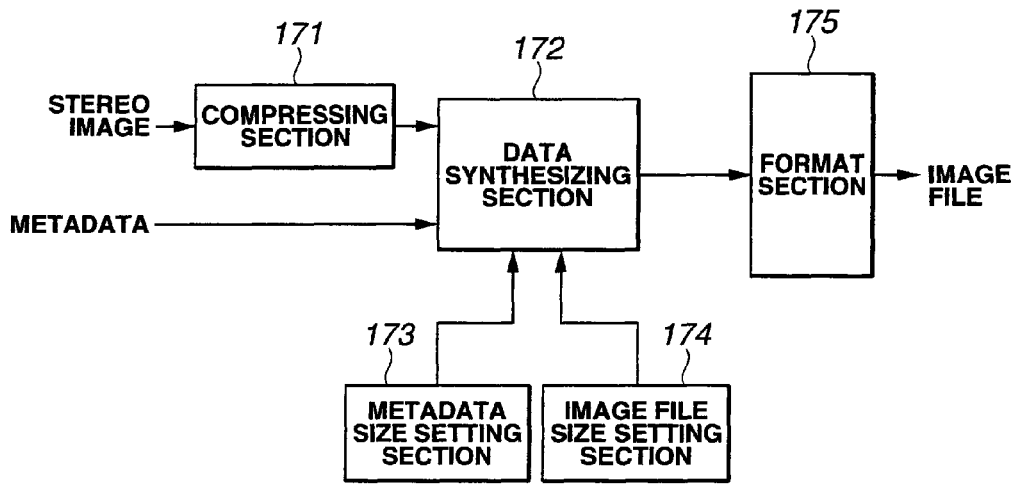
FIG. 10 is a block diagram showing a specific structure of an image file generating section 50c shown in FIG. 9.
Figure 11:
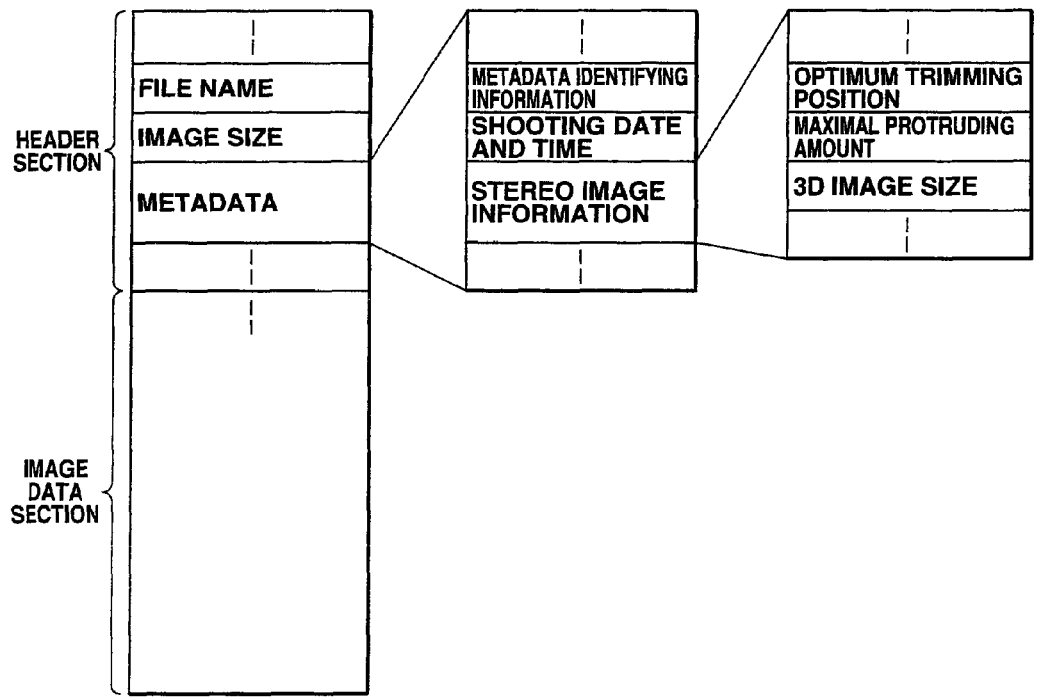
FIG. 11 is an illustrative view showing an example of an image file generated by the image file generating section 50c.

FIG. 10 is a block diagram showing a specific structure of the image file generating section 150c shown in FIG. 9. In addition, FIG. 11 is an illustrative view showing an example of an image file generated by the image file generating section 150c.

A compressing section 171 of the image file generating section 150c is input with image data of the stereo image. The compressing section 171 executes predetermined operation to compress image data of the stereo image that is output to a data synthesizing section 172. Metadata is also input to the data synthesizing section 172, by which image data and metadata are synthesized.

With the present embodiment, the image file generating section 150c further includes a metadata size setting section 173 and an image file size setting section 174. The metadata size setting section 173 is configured to have capability of outputting information of the stereo image with an image size (3D-image size) (in pixel count) to the data synthesizing section 172. Further, the image file size setting section 174 is configured to have capability of outputting information of an image with an image size (pixel count) depending on image data. Note that, the metadata size setting section 173 and the image file size setting section 174 play roles to set information with an image size of the image depending on identical image data and, accordingly, if image data is data related to the stereo image, the outputs of the setting sections 173, 174 result in information with the image sizes equal to each other.

The data synthesizing section 172 synthesizes various input data for delivery to a format section 175. The format section 175 allows various input data to be arranged in accordance with a predetermined image format and outputs such input data as one image file.

As shown in FIG. 11, the image file has a header section and an image data section. Image data, compressed by the compressing section 171, is placed in the image data section. The header section is placed with a file name of an image file, information on an image size, and metadata. Information on the image size is set by the image file size setting section 174.

Metadata contains metadata discriminating information, an image shooting date and time information, and stereo image information. Note that, shooting date and time information includes information that is generated by the metadata generating section 150a and contained in metadata being input to the data synthesizing section 172.

If image data, placed in the image data section, belongs to stereo image, stereo image information contains a variety of information related to the stereo image. The metadata generating section 150a generates information on the optimum trimming position and information on the maximal protruding amount that are included in metadata being input to the data synthesizing section 172. Information on the 3D image size is information set by the metadata size setting section 173 and represents an image size of the stereo image on the basis of image data. Here, as described above, 3D image size information recorded as metadata and image size information recorded in the header section of the image file have the same contents.

Moreover, while the file format shown in FIG. 11 represents one example of the image file and FIG. 11 has been explained with reference to an example wherein the 3D image size is placed as a part of stereo image information, the 3D image size may be located in another area of metadata.

Further, while with the present embodiment, the controller 150 has been described as being 3D-compliant, if the controller 150 is non-3D-compliant, for instance, a predetermined initial value is set in a description area of stereo image information in the metadata area or none of information is described therein.

Figure 12:
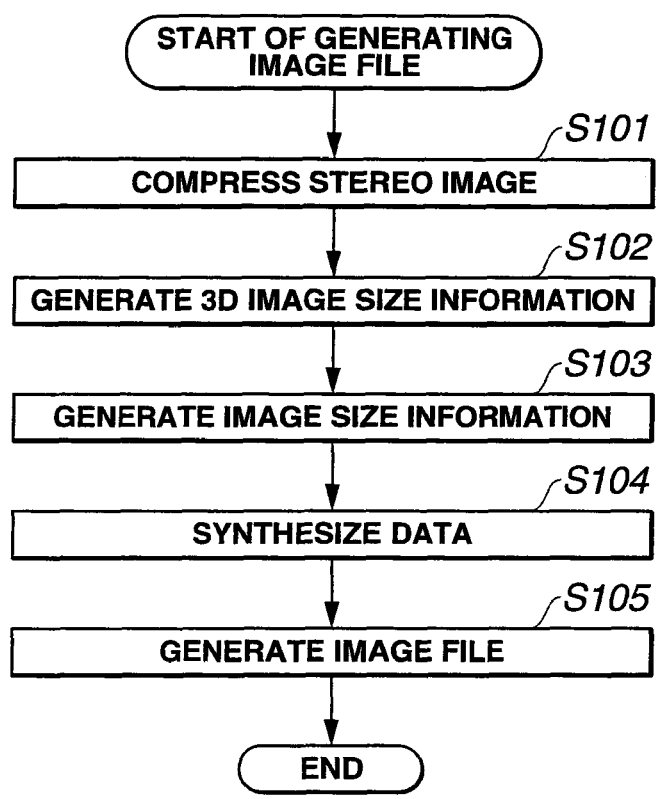
FIG. 12 is a flow chart showing an operational flow of the image file generating section 50c.

Next, the operation of the present embodiment with such a structure is described below with reference to FIG. 12. FIG. 12 is a flow chart showing an operational flow of the image file generating section 150c.

Now, suppose the stereo changeover switch 54 commands a stereo shooting mode. A subject optical image, incoming through the stereo adapter 10, passes through the shooting lens group 21, the exposure control mechanism 22, the half mirror 31 and the filter system 32 and is focused on the imaging area of the CCD color image pickup element 34. The CCD color image pickup element 34 outputs data of one image containing the left and right monocular images L, R. The image signal delivered from the CCD color image pickup element 34 is input to the controller 150 via the preprocessing circuit 36.

The stereo image generating section 50b generates an integrated image with monocular images placed on left and right areas on the basis of the input image signal. The metadata generating section 150a generates shooting date and time information, related to the resulting integrated image, and stereo image information.

In step S101 of FIG. 12, the image file generating section 150c executes predetermined operation to compress the resulting integrated image (stereo image). In subsequent step S102, the metadata size setting section 173 of the image file generating section 150c generates information of an image size (3D image size) of the stereo image to be stored in the image data section. In step S103, the image file size setting section 174 of the image file generating section 150c generates information on the image size of the image to be stored in the image data section. That is, in this case, the 3D image size, set by the metadata size setting section 173, and the image size, set by the image file size setting section 174, take the same values.

The image file generating section 150c allows the data synthesizing section 172 to synthesize information related to a stereo image, metadata, a 3D image size and image size (in step S104), after which the format section 175 generates an image file with the data format shown in FIG. 11 (in step S105).

The image file, generated by the image file generating section 150c, is supplied to the digital processing circuit 39. The digital processing circuit 39 can provide a display of the integrated image on a display screen of the LCD 40 on the basis of the input electronic image file. Further, the digital processing circuit 39 can also supply the input electronic image file via the card file IF 41 to the memory card 42 for storage therein.

With the present embodiment, thus, the image file generated by the image file generating section has metadata placed with, in addition to information related to the image size of the image on the basis of image data of the image file, the 3D image size of the same image. Information on the image size of the stereo image is placed independently of information on the image size of the header section of the image file and such information can be managed in a separate fashion. With the image file generated (updated) with non-3D-compliant equipment or software, no 3D image size of metadata related to the stereo image information is generated nor updated. Therefore, comparing information on these image sizes with respect to each other enables judgment to be made as to whether or not the image file is generated or updated with non-3D-compliant equipment or software.

Further, while the present embodiment has been set forth above with reference to an example wherein the image processing apparatus, including the image file generating section, generates the image file, it is apparent that the image file generating section can be realized using software having a similar function. That is, by using a computer capable for executing programs having the same functions as those of the flow chart shown in FIG. 12, the image file generating section similar to that shown in FIG. 10 can be formed.

Furthermore, in a case where the image file generating section 150c is structured with software, the image file setting section 174 may be structured with, for instance, an operation system or the like of a computer and an image size of the image file may be automatically described during the generation (updating) of the file in common practice.

Moreover, while the fourth embodiment has been described with reference to an example as applied to the electronic camera, the present embodiment may have another application to a sole image processing apparatus arranged to process an image shot by the electronic camera and, also, can achieve a similar function through the use of programs of a personal computer or the like adapted to process a picked up image.

In addition, while the present embodiment has been described with reference to an example wherein one image with the monocular images placed on left and right areas is obtained with the camera and the stereo image is generated on the basis of such an image, it is apparent that the present embodiment can be applied to a structure wherein, for instance, individual monocular images, obtained upon shooting with two cameras in separate ways, are independently input to allow one stereo image to be generated on the basis of these monocular images.

Fifth Embodiment

Figure 13:
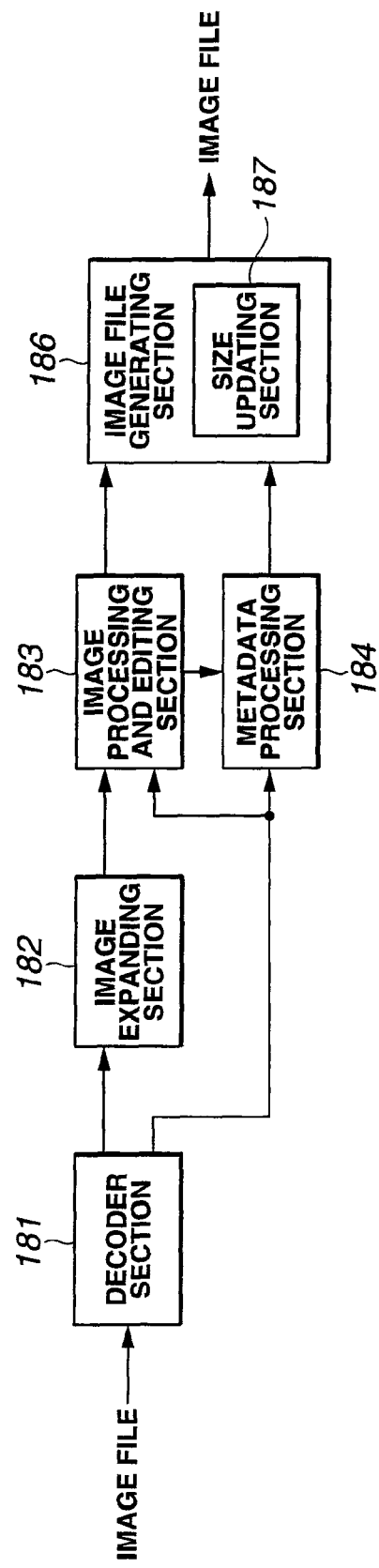
FIG. 13 is a block diagram showing an image processing and editing apparatus of a fifth embodiment according to the present invention.

FIG. 13 is a block diagram showing an image processing and editing apparatus of a fifth embodiment according to the present invention and FIG. 14 is a flow chart showing a process flow for generating an image file. The present embodiment is applied to the image file editing apparatus shown in FIG. 11. Note that, the present embodiment can be realized using software having the same functions as those of the apparatus shown in FIG. 13.

A decoder section 181 is input with the image file having the data format shown in FIG. 11. The decoder section 181 decodes the input image file and retrieves various data from the image file. The decoder section 181 delivers image data of the image file to an image expanding section 182 while delivering metadata to a metadata processing section 184.

The image expanding section 182 expands input image data and obtains image data prior to compression thereof. This image data is supplied to an image processing and editing section 183.

The image processing and editing section 183 executes the processing and editing of the input image data depending on processing and editing operations executed by a user (in step S111) and outputs an image data, subjected to the processing and editing, to an image file generating section 186. Note that, the image processing and editing section 183 can refer to metadata of image data, which is processed and edited, for use in the processing and editing operations.

The metadata processing section 184 updates metadata on the basis of the processing and editing operations of the image processing and editing section 183. For instance, in a case where the processing and editing operations of the image processing and editing section 183 belong to trimming operation for a stereo image, the metadata processing section 184 updates information on an optimum trimming position, indicative of an optimum clipping area in compliance with such trimming operation, and information on a maximal protruding amount.

An image file generating section 186 synthesizes image data, delivered from the image processing and editing section 183, and metadata, delivered from the metadata processing section 184, for generating an image file with the file format shown in FIG. 11. A size updating section 187 of the image file generating section 186 has the same functions as those of the metadata size setting section 173 and the image size setting section 174, shown in FIG. 10, and generates image size information on an image resulting from the image processing and editing section 183 upon processing and editing operations thereof (in step S112). The image file generating section 186 rewrites image size information (see FIG. 11) of the image file in the file format to information generated by the size updating section 187. Further, the image file generating section 186 rewrites 3D image size information (see FIG. 11) of metadata in the file format to information generated by the size updating section 187 (in step S113). Thus, the image file generating section 186 generates and outputs an image file in which the image size in the image file and the 3D image size in metadata are altered to the same information (in step S114).

With the present embodiment, thus, metadata is updated in accordance with the processing and editing of the image and image size information, altered in accordance with the processing and editing, is written in the image size in the image file and the 3D image size in metadata. This allows the image size in the image file and the 3D image size in metadata to match each other in information as far as the image is processed and edited using the editing apparatus of the present embodiment.

Sixth Embodiment

Figure 16:
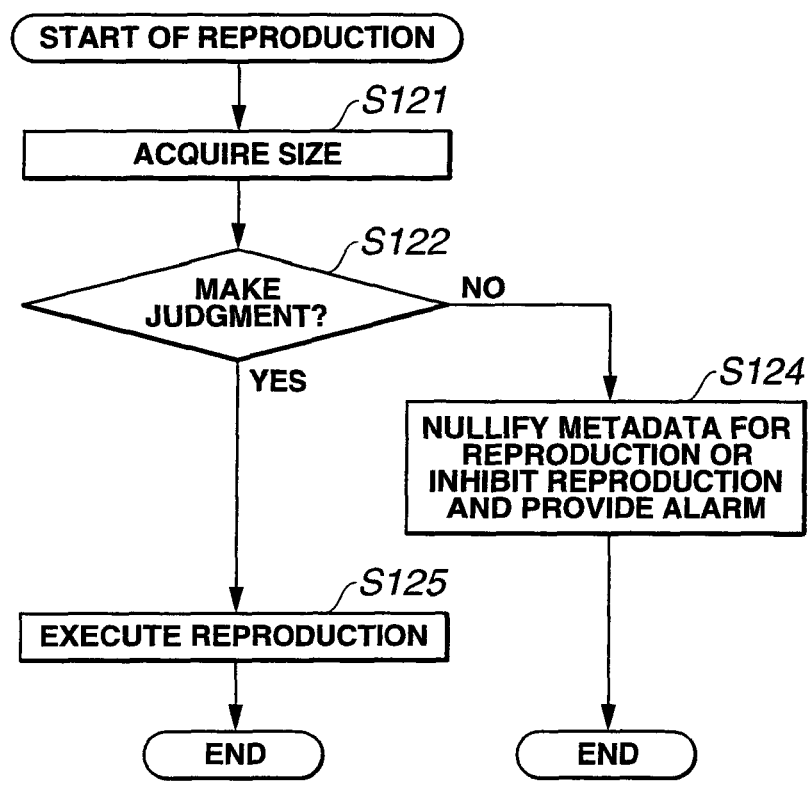
FIG. 16 is a flow chart showing a processing flow of an image file.

FIG. 15 is a block diagram showing an image file reproducing apparatus of a sixth embodiment according to the present invention and FIG. 16 is a flow chart showing a process flow of an image file. The present embodiment is applied to the image file reproducing apparatus shown in FIG. 11. Note that, the present embodiment may be realized using software having the same functions as those of the apparatus shown in FIG. 15.

A decoder section 191 is input with the image file having the file format shown in FIG. 11. The decoder section 191 decodes the input image file and retrieves various data from the image file. The decoder section 191 delivers image data of the image file to an image expanding section 192 while delivering metadata to a changeover section 196, a metadata nullifying section 195 and a size judgment section 194.

The image expanding section 192 expands input image data and obtains image data prior to compression thereof. This image data is supplied to a reproduction processing section 193.

The size judgment section 194 obtains information on the image size in the image file (see FIG. 11) and information on a 3D image size in metadata (in step S121). The size judgment section 194 makes judgment as to whether or not the image size in the resulting image file and the 3D image size in metadata match each other (in step S122). The size judgment section 194 outputs a judgment result to the changeover section 196 and an alarm section 197.

The metadata nullifying section 195 nullifies input metadata (in step S124). For instance, the metadata nullifying section 195 allows parameters of metadata, related to the stereo image, to be deleted or set to initial values for thereby executing the nullification.

On the basis of the judgment result of the size judgment section 194, the changeover section 196 selectively supplies one of metadata, delivered from the decoder section 191, or metadata, delivered from the metadata nullifying section 195, to the reproduction processing section 193. For instance, the changeover section 196 supplies metadata from the decoder section 191 to the reproduction processing section 193 in response to a judgment result representing matched image sizes and inhibits the reproduction processing in response to a judgment result indicative of the unmatched image sizes (in step S24).

The reproduction processing section 193 executes predetermined reproduction processing on image data using metadata delivered from the changeover section 196 (in step S125). Further, the reproduction processing section 193 may be configured to supply metadata information, set by the metadata nullifying section 195, to the reproduction processing section 193 when supplied with a judgment result representing the unmatched image sizes from the size judgment section 194.

An alarm section 197 is configured to provide a user with, for instance, an alarm using, for instance, an alarm display or the like when the judgment result from the size judgment section 194 represents the unmatched image sizes.

With the present embodiment, thus, for the image file with individual image sizes independently described in the file header and metadata, reproduction processing is inhibited as having no correlation between image data and metadata, when both the image sizes are unmatched, or executed using nullified metadata. By so doing, under a circumstance where the image is processed and edited with non-3D-compliant equipment or software, reproduction processing using metadata with no correlation to image data can be prevented.

Note that, while the each embodiment has been described with reference to the stereo system of the two-eye system associated with the left and right both eyes, it is needless to say that the present invention can be applied to a common multiple-eye stereo system with more than three eyes.

Further, it is apparent that the present invention can also be applied to a moving image.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:
1. An image file processing apparatus comprising:
a system controller comprising a CPU;
a stereo image data generating section which generates stereo image data based on a plurality of monocular images of a same subject obtained with a predetermined parallax;
a collateral data generating section which generates collateral data related to the stereo image data;
a first stereo image size information generating section which generates first information related to an image size of the stereo image data;
a second stereo image size information generating section which generates second information related to the image size of the stereo image data; and
an image file generating section which generates an image file, the image file including an image data section and a header section in which the collateral data is recorded;
wherein the system controller implements the stereo image data generating section, the collateral data generating section, the first stereo image size information generating section, the second stereo image size information generating section, and the image file generating section;
wherein the image file generating section records the stereo image data generated by the stereo image data generating section in the image data section and records the collateral data generated by the collateral data generating section in the header section; and wherein the image file generating section records the first information in the header section and separately from the collateral data, and records the second information in the collateral data.

2. An image processing method comprising:

generating stereo image data based on a plurality of monocular images of a same subject obtained with a predetermined parallax;

generating collateral data related to the stereo image data;

generating first information related to an image size of the stereo image data, generating second information related to the image size of the stereo image data;

generating an image file, the image file including an image data section and a header section in which the collateral data is recorded;

wherein the generated stereo image data is recorded in the image data section and the generated collateral data is recorded in the header section; and wherein the generated first information is recorded in the header section and separately from the collateral data, and the generated second information is recorded in the collateral data.

* * * * *